US006853789B2

(12) United States Patent
Mekis et al.

(10) Patent No.: US 6,853,789 B2
(45) Date of Patent: Feb. 8, 2005

(54) LOW-LOSS RESONATOR AND METHOD OF MAKING SAME

(76) Inventors: Attila Mekis, 111 Queensburry St., Apt. 4, Boston, MA (US) 02215; Shanhui Fan, 859 Clark Way, Palo Alto, CA (US) 94304; John D. Joannopoulos, 64 Douglas Rd., Belmont, MA (US) 02178; Pierre Villeneuve, 61 Brookline Ave., Apt. 407, Boston, MA (US) 02215

( * ) Notice: Subject to any disclaimer, the term of this patent is extended or adjusted under 35 U.S.C. 154(b) by 344 days.

(21) Appl. No.: 09/884,763

(22) Filed: Jun. 19, 2001

(65) Prior Publication Data

US 2002/0097770 A1 Jul. 25, 2002

Related U.S. Application Data

(60) Provisional application No. 60/212,409, filed on Jun. 19, 2000.

(51) Int. Cl.[7] .............................. G02B 6/10; G02B 6/26

(52) U.S. Cl. .......................................... 385/129; 385/15

(58) Field of Search ................................. 385/129, 130, 385/131, 132

(56) References Cited

U.S. PATENT DOCUMENTS

| | | | | | |
|---|---|---|---|---|---|
| 4,135,787 | A | * | 1/1979 | McLafferty | 359/858 |
| 5,311,605 | A | * | 5/1994 | Stewart | 385/27 |
| 6,035,089 | A | * | 3/2000 | Grann et al. | 385/129 |
| 6,130,969 | A | * | 10/2000 | Villeneuve et al. | 385/27 |
| 6,334,019 | B1 | * | 12/2001 | Birks et al. | 385/125 |

OTHER PUBLICATIONS

"Microcavities in photonic crystals: Mode symmetry, tenability, and coupling efficiency", Villeneuve et al., Physical Review B. vol. 54, No. 11, Sep. 15, 1996, The American Physical Society, pp. : 7837–7842.

"Whispering–gallery mode microdisk lasers", McCall et al., Appl. Phys. Lett., Jan. 20, 1992, American Institute of Physics, pp. : 289–291.

"Surface–roughness–induced contradirectional coupling in ring and disk resonators", Little et al., Optics Letters, vol. 22, No. 1, Jan. 1, 1997; 1997 Optical Society of America; pp. : 4–6.

"Guided and defect modes in periodic dielectric waveguides"; Fan et al., 1995 Optical Society of America, vol. 12, No. 7, pp. : 1267–1272.

"Air–bridge microcavities", Villeneuve et al., 1995 American Institute of Physics, Appl. Phys. Lett. 67, Jul. 10, 1995, pp. : 167–169.

"Guided Modes in Photonic Crystal Slabs" Physical Review B, vol. 60, No. 8, Aug. 15,1999, The American Physical Society, pp. : 5751–5758.

(List continued on next page.)

*Primary Examiner*—John D. Lee
*Assistant Examiner*—Jennifer Doan
(74) *Attorney, Agent, or Firm*—Gauthier & Connors LLP

(57) ABSTRACT

A method of making a low-loss electromagnetic wave resonator structure. The method includes providing a resonator structure, the resonator structure including a confining device and a surrounding medium. The resonator structure supporting at least one resonant mode, the resonant mode displaying a near-field pattern in the vicinity of said confining device and a far-field radiation pattern away from the confining device. The surrounding medium supports at least one radiation channel into which the resonant mode can couple. The resonator structure is specifically configured to reduce or eliminate radiation loss from said resonant mode into at least one of the radiation channels, while keeping the characteristics of the near-field pattern substantially unchanged.

26 Claims, 16 Drawing Sheets

OTHER PUBLICATIONS

"Three–dimensional photon confinement in photonic crystals of low–dimensional periodicity", Villeneuve et al., vol. 145, No. 6, Dec. 1998, pp. : 384–390.

"Radiation losses of waveguide–based two–dimensional photonic crystals: Positive role of the substrate", Benisty et al., Applied physics Letters, vol. 76, No. 5, Jan. 31, 2000, pp. 532–534.

"Defect modes of a two–dimensional photonic crystal in an optically thin dielectric slab", Painter et al., 1999 Optical Society of America, vol. 16, No. 2, Feb. 1999, pp. : 275–285.

"Multiple–cancellation mechanism for high–Q cavities in the absence of a complete photonic band gap", Johnson et al., Applied Physics Letters, vol. 78, NO. 22, May 28,2001, pp. : 3388–3390.

"Ray Chaos and Q Spoiling in Lasing Droplets", Mekis et al., Physical Review Letters, vol. 75, No. 14, Oct. 2, 1995, The American Physical Society, pp. : 2682–2685.

"High Extraction Efficiency of Spontaneous Emission from Slabs of Photonic Crystals", Fan et al., Physical Review Letters, vol. 78, No. 17, Apr. 28, 1997, pp. : 3294–3297.

Quantum Electronics and Femtosecond Optics, Memo No. 57, Oct. 11, 1994; "The Radiation Q of Open Photonic–Gap Bridge Resonators"; by H.A. Haus; Department of Electrical Engineering and Computer Science and Research Laboratory of Electronics; Massachusetts Institute of Technology; Cambridge, MA; pp. : 1–13.

* cited by examiner

FIG. 17A
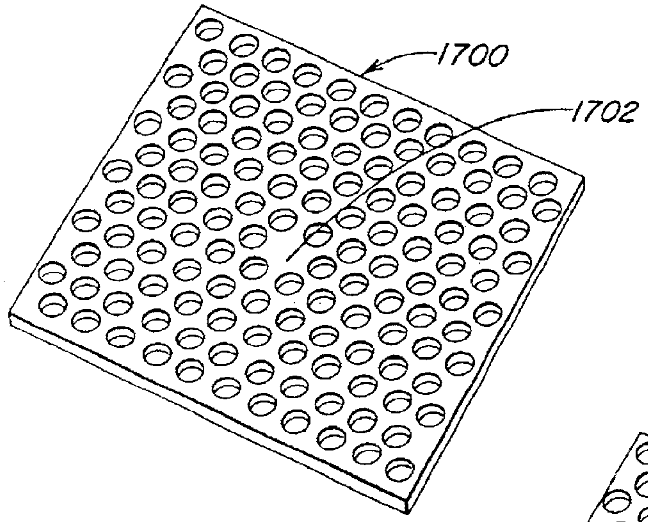
FIG. 17B
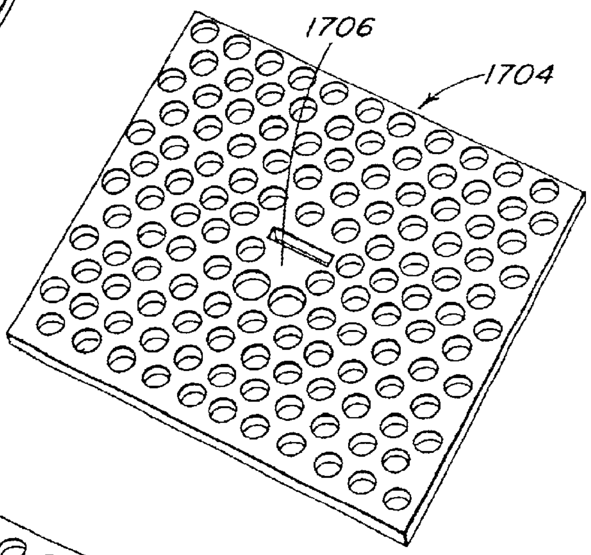
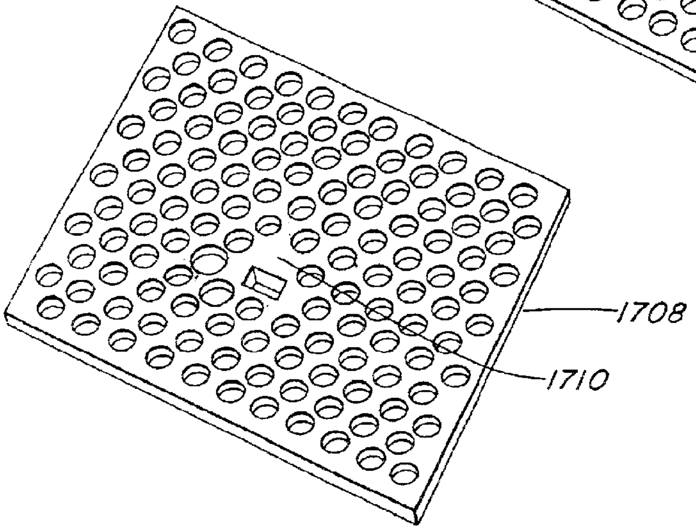
FIG. 17C

LOW-LOSS RESONATOR AND METHOD OF MAKING SAME

PRIORITY INFORMATION

This application claims priority from provisional application Ser. No. 60/212,409 filed Jun. 19, 2000.

BACKGROUND OF THE INVENTION

The invention relates to the field of low-loss resonators.

Electromagnetic resonators spatially confine electromagnetic energy. Such resonators have been widely used in lasers, and as narrow-bandpass filters. A figure of merit of an electromagnetic resonator is the quality factor Q. The Q-factor measures the number of periods that electromagnetic fields can oscillate in a resonator before the power in the resonator significantly leaks out. Higher Q-factor implies lower losses. In many devices, such as in the narrow bandpass filtering applications, a high quality factor is typically desirable.

In order to construct an electromagnetic resonator, i.e., a cavity, it is necessary to provide reflection mechanisms in order to confine the electromagnetic fields within the resonator. These mechanisms include total-internal reflection, i.e. index confinement, photonic band gap effects in a photonic crystal, i.e., a periodic dielectric structure, or the use of metals. Some of these mechanisms, for example, a complete photonic bandgap, or a perfect conductor, provide complete confinement: incident electromagnetic wave can be completely reflected regardless of the incidence angle. Therefore, by surrounding a resonator, i.e., a cavity, in all three dimensions, with either a three-dimensional photonic crystal 100 with a complete photonic bandgap as shown in FIG. 1A, or a perfect conductor with minimal absorption losses, the resonant mode in the cavity can be completely isolated from the external world, resulting in a very large Q. In the case of a cavity embedded in a 3D photonic crystal with a complete bandgap, the Q in fact increases exponentially with the size of the photonic crystal.

Total internal reflection, or index confinement, on the other hand, is an incomplete confining mechanism. The electromagnetic wave is completely reflected only if the incidence angle is larger than a critical angle. Another example of an incomplete confining mechanism is a photonic crystal with an incomplete photonic bandgap. An incomplete photonic bandgap reflects electromagnetic wave propagating along some directions, while allowing transmissions of electromagnetic energy along other directions. If a resonator is constructed using these incomplete confining mechanisms, since a resonant mode is made up of a linear combination of components with all possible wavevectors, part of the electromagnetic energy will inevitably leak out into the surrounding media, resulting in an intrinsic loss of energy. Such a radiation loss defines the radiation Q, or intrinsic Q, of the resonator, which provides the upper limit for the achievable quality factor in a resonator structure.

In practice, many electromagnetic resonators employ an incomplete confining mechanism along at least one of the dimensions. Examples include disk, ring, or sphere resonators, distributed-feedback structures with a one-dimensional photonic band gap, and photonic crystal slab structures with a two-dimensional photonic band gap. In all these examples, light is confined in at least one of the directions with the use of index confinement.

The radiation properties of all these structures have been studied extensively and are summarized below.

In a disk 102, ring or sphere resonator (FIG. 1B), the electromagnetic energy is confined in all three dimensions by index confinement. Since index confinement provides an incomplete confining mechanism, the electromagnetic energy can leak out in all three dimensions. Many efforts have been reported in trying to tailor the radiation leakage from microdisk resonators. It has been shown that the radiation Q can be increased by the use of a large resonator structure that supports modes with a higher angular momentum, and by reducing the surface roughness of a resonator. Also, the use of an asymmetric resonator to tailor the far-field radiation pattern and decrease the radiation Q has been reported.

In a distributed-feedback cavity structure 104 as shown in FIG. 1C, or a one-dimensional photonic crystal structure, electromagnetic energy is confined in a hybrid fashion. Here, a cavity is formed by introducing a phase-shift, or a point defect into an otherwise perfectly periodic dielectric structure. The one-dimensional periodicity opens up a photonic band gap, which provides the mechanism to confine light along the direction of the periodicity. In the other two dimensions, the energy is confined with the use of index confinement. The leakage along the direction of the periodic index contrast can in principle be made arbitrarily small by increasing the number of periods on both sides of the cavity. This leakage is often termed butt loss, and is distinct from radiation loss. In the other two dimensions, however, light will be able to leak out. The energy loss along these two dimensions limits the radiation Q of the structure. Radiation Q of these structures have been analyzed by many. The radiation Q can be improved by increasing the index contrast between the cavity region and the surrounding media, by choosing the symmetry of the resonance mode to be odd rather than even, and by designing the size of the phase shift such that the resonance frequency is closer to the edge of the photonic band gap.

Similar to the distributed feedback structure, a photonic crystal slab structure 106 as shown in FIG. 1D employs both the index confinement and the photonic band gap effects. A photonic crystal slab is created by inducing a two-dimensionally periodic index contrast into a high-index guiding layer. A resonator in a photonic crystal slab can be created by breaking the periodicity in a local region to introduce a point defect. A point defect consists of a local change of either the dielectric constant, or the structural parameters. Within the plane of periodicity, the electromagnetic field is confined by the presence of a two-dimensional photonic band gap. When such a band gap is complete, the leakage within the plane can in principle be made arbitrarily small by increasing the number of periods of the crystal surrounding the defect. In the direction perpendicular to the high-index guiding layer, however, light will be able to leak out. The energy loss along this direction defines the radiation Q. It has been shown that such radiation Q can be improved by the use of a super defect, where the resonance modes are intentionally delocalized within the guiding layer in order to minimize the radiation losses in the vertical direction. Some have argued that high radiation Q in a two-dimensionally periodic photonic crystal slab geometry can be achieved by employing low index contrast-films in order to delocalize the resonant mode perpendicular to the guiding layer. Others have shown that the radiation Q can be improved by adjusting the dielectric constant in the defect region.

SUMMARY OF THE INVENTION

In accordance with one embodiment of the invention there is provided a method of making a low-loss electromagnetic wave resonator structure. The method includes providing a resonator structure, the resonator structure including a confining device and a surrounding medium. The resonator structure supports at least one resonant mode, the resonant mode displaying a near-field pattern in the vicinity of said confining device and a far-field radiation pattern away from the confining device. The surrounding medium supports at least one radiation channel into which the resonant mode can couple. The resonator structure is specifically configured to reduce or eliminate radiation loss from said resonant mode into at least one of the radiation channels, while keeping the characteristics of the near-field pattern substantially unchanged.

BRIEF DESCRIPTION OF THE DRAWINGS

FIG. 17A is a perspective view of a simplified diagram of a photonic crystal slab with a point defect microcavity; FIG. 17B is a perspective view of a simplified diagram of an improved microcavity in a photonic crystal slab where the geometry of the patterning or the dielectric constant of the defect region is altered to increase the radiation Q; FIG. 17C is a perspective view of a simplified diagram of another improved microcavity in a photonic crystal slab where the geometry of the patterning or the dielectric constant of the defect region is altered in an asymmetrical fashion to increase the radiation Q;

DETAILED DESCRIPTION OF THE INVENTION

In accordance with the invention, a method of improving the radiation pattern of a resonator is provided. The method is fundamentally different from all the prior art as described above. The method relies upon the relationship of the radiation Q to the far-field radiation pattern. By designing the resonator structure properly, it is possible to affect the far-field radiation pattern, and thereby increase the radiation Q.

The general purpose of the method of the invention is to design electromagnetic wave resonators with low radiative energy losses. The rate of loss can be characterized by the quality factor (Q) of the resonator. One can determine the amount of radiation by integrating the energy flux over a closed surface far from the resonator. Thus, from the knowledge of the radiation pattern in the far field, it is possible to determine the resonator Q.

The radiation field can be broken down into radiation into different channels in the far field into which radiation can be emitted. Specifically, if the far-field medium is homogenous everywhere, these channels are different angular momentum spherical or cylindrical waves, depending on the specific geometry of the device. The radiation Q of a resonator can be improved by reducing the amount of radiation emitted into one or more of the dominant channels. In the case of radiation into a homogenous far field medium, high angular momenta contribute less to the total radiation than low angular momenta of similar amplitudes, because the former have more nodal planes.

Figure 1A:
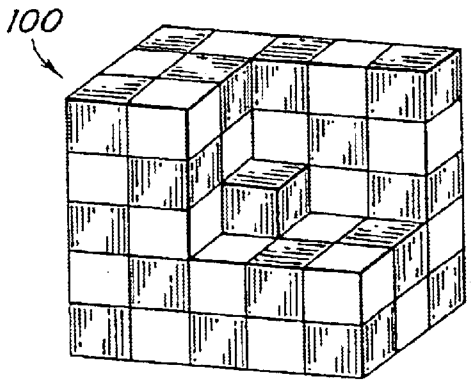
FIG. 1A (PRIOR ART)
FIGS. 1A–1D are simplified schematic diagrams of a cavity embedded in a 3D photonic crystal, a microdisk cavity, a cavity in a one-dimensional photonic crystal, and a cavity in a two-dimensional photonic crystal, respectively.
Figure 1B:
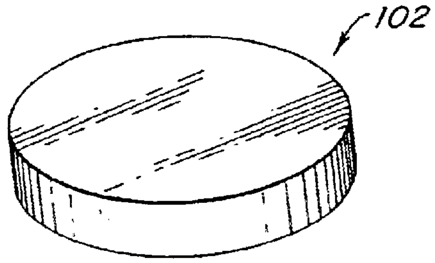
FIG. 1B (PRIOR ART)
Figure 1C:
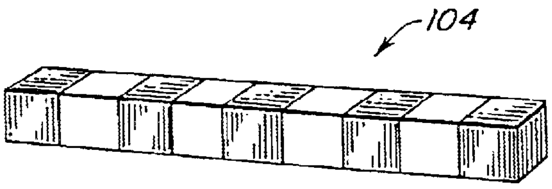
FIG. 1C (PRIOR ART)
Figure 1D:
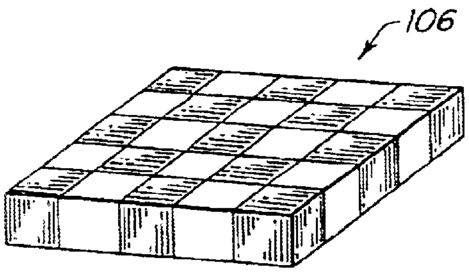
FIG. 1D (PRIOR ART)
Figure 2A:
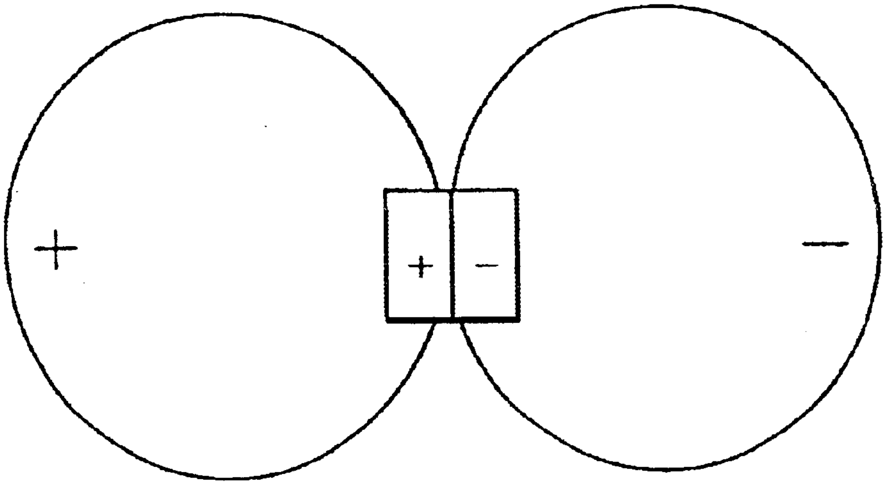
FIG. 2A is a schematic view of the far-field radiation pattern of a resonator.
Figure 2B:
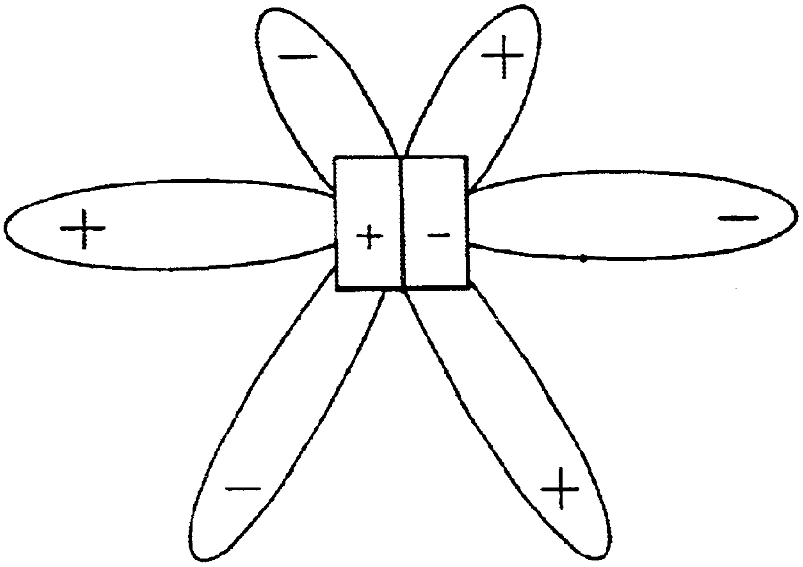
FIG. 2B is a schematic view of the radiation pattern of an improved resonator that radiates into high angular momentum channels.

Therefore, reducing radiation into the low angular momentum channels provides a particularly effective way to increase radiation Q. This is shown schematically in FIGS. 2A and 2B. FIG. 2A is a schematic view of the far-filed radiation pattern of a resonator. FIG. 2B is a schematic view of the radiation pattern of an improved resonator that radiates into high angular momentum channels.

Moreover, there is a direct relationship between the near-field and the far-field pattern, supplied by Maxwell's equation:

$$\nabla \times \nabla \times E(r) = \frac{\omega^2}{c^2}\varepsilon(r)E(r) \tag{1}$$

where ω is the frequency of the resonant mode, c is the speed of light, ε(r) is the space-dependent dielectric constant that defines the resonator and the far field medium, and E(r) is the electric field.

The near-field pattern of the resonant mode and the dielectric structure also determines the far field radiation pattern. Therefore, it is possible to devise the near-field pattern of a resonator to obtain a far-field pattern that corresponds to a high Q. This can be achieved by appropriate design of the resonator ε(r). If the goal is to reduce radiation losses from a given type of resonator, one can adapt either the resonator itself or the surrounding medium to change the near-field pattern (which is usually well known for a particular resonator design), and so modify the radiation field in a desired manner. The radiation field can be modified to select one or more solid angles into which radiation is channeled to create a resonator with a directional radiation output. This method can be used to increase or to decrease the radiation Q. Correspondingly, the far-field pattern can be altered in any fashion via an appropriate design of ε(r).

Those skilled in the art will also appreciate the fact that the propagation of all types of waves are described by an equation similar to equation (1). Therefore, it is possible to employ the above ideas to resonators confining any type of wave, whether electromagnetic, acoustic, electronic, or other. Hence, the method of the invention can also be used to reduce radiation losses in other types of resonators.

Waveguide Grating Defect Mode

The method described in accordance with the invention is applicable to all types of confinement mechanisms. These include electromagnetic wave resonators utilizing a photonic crystal band gap effect, index confinement, or a combination of both of these mechanisms.

One exemplary embodiment of the invention is applicable to one-dimensional photonic crystals. The method of the invention is demonstrated for a specific example, namely, for a two-dimensional waveguide into which a grating with a defect is etched. The defect can be, for instance, a simple phase shift. The dielectric constant of the structure is illustrated schematically in FIG. 3A, which is a schematic of dielectric constant ε(r) of a two-dimensional waveguide with a grating. The resonant mode is confined along the waveguide by a photonic band gap effect and in the other directions by index confinement.

To simplify the discussion, it is assumed that the mode is TE polarized, therefore the electric field is a scalar, and equation (1) is simplified to $$\left[\nabla^2 + \frac{\omega^2}{c^2}\varepsilon(r)\right]E(r) = 0 \tag{2}$$

The radiation pattern of the resonant mode is computed by applying equation (2). It follows that $\epsilon(r)=\epsilon_0(r)+\epsilon_1(r)$, where $\epsilon_0(r)$ is the dielectric constant of the waveguide without the grating, defined as the zeroth order Fourier component of ε(r) where the transform is taken in the z-direction, and $\epsilon_1(r)$ represents a perturbation that yields the grating with the phase shift. The dielectric functions $\epsilon_0(r)$ and $\epsilon_1(r)$ are illustrated in FIGS. 3B and 3C, respectively. Equation (2) is solved using the Green's function G(r,r') appropriate for the waveguide dielectric function $\epsilon_0(r)$. The radiation field is then given by $$E_{\mathrm{rad}}(r) = \frac{\omega^2}{c^2}\int dr' G(r, r')\varepsilon_1(r')E(r') \tag{3}$$

where E(r) is the resonant mode field pattern, i.e., the near-field pattern. The goal is to adjust $\epsilon_1(r)$ to modify the radiation field in such a way as to increase the radiation Q of the resonant mode. Those skilled in the art will appreciate that ε(r) can be divided up in any fashion, as long as the appropriate Green's function is used. If $\epsilon_0(r)$ is just a constant dielectric background, the well-known free space Green's function can be used.

For simplicity, a square-tooth grating of uniform depth is considered. In this case, $\epsilon_1(r)$ becomes separable in Cartesian coordinates, that is, $$\varepsilon_1(r) = \begin{cases} \Delta\varepsilon\varepsilon_1(z) & \text{if } y_0 < y < y_1 \\ 0 & \text{otherwise} \end{cases} \tag{4}$$

and the grating profile $\epsilon_1(z)$ can take values 1 or −1. It can also be shown that the Green's function of the waveguide in the far field is a cylindrical wave with a profile $g(\theta, y^1)$. The resonant mode near-field pattern is known to be a linear combination of forward and backward propagating guided modes $(Ae^{i\beta z}+Be^{-i\beta z})e^{-\kappa|z|}p(y)$ where β is the propagation constant for the mode, κ is the decay constant in the grating and the mode profile p(y) depends on the type of unpatterned waveguide.

Denoting the wave vector in the far-field medium by k, it follows that the radiation field $$E_{\mathrm{rad}}(r) = \frac{\omega^2 e^{ikr}}{4\pi c^2\sqrt{r}}\int_{y_0}^{y_1} dy' e^{-ik\sin\theta y'} g(\theta, y')p(y')\int dz' e^{-ik\cos\theta z'}\varepsilon_1(z')(Ae^{i\beta z} + Be^{-i\beta z}) \tag{5}$$

So the total energy radiated is proportional to the following functional R:

$$R(\varepsilon_1) = \int_0^{2\pi} d\theta |P(\theta)|^2 |AF(-k\cos\theta + \beta) + BF(-k\cos\theta - \beta)|^2 \tag{6}$$

where F(k) is the Fourier transform of $\epsilon_1(z)e^{-\kappa|z|}$. Furthermore, the function P(θ) depends only on the unpatterned waveguide used and the grating depth, but not on $\epsilon_1(z)$. To find an optimal grating profile $\epsilon_1(z)$, which yields a high Q resonant system, the functional R is minimized. One way to achieve a small value for R is to design the Fourier transform F so the two terms containing A and B in equation (6) are equal in magnitude but opposite in sign for several values of θ. In such a case, the radiation fields due to the forward and backward propagating waves interfere destructively. The interference results in the appearance of nodal planes in the radiation field pattern, which means that radiation is redirected into high angular momentum channels. Hence, radiation losses are reduced, and the Q factor increases.

The specific case where the waveguide is a $Si_3N_4$ waveguide of thickness 0.3 μm embedded in $SiO_2$ cladding is considered. The refractive index of the cladding is 1.445 and that of the waveguide material is 2.1. The grating has a duty cycle of 0.5, a depth of 0.1 μm and pitch of 0.5 μm, and the phase shift is a quarter-wave shift of length 0.25 μm. The resonant mode at wavelength 1.68 μm has a quality factor Q=11280. Since the resonator has a plane of symmetry at z=0, the two possible modes are an even, s-like state (A=B=1), and an odd, p-like state (A=−B=1). It also follows that F(k) is even.

Figure 3A:
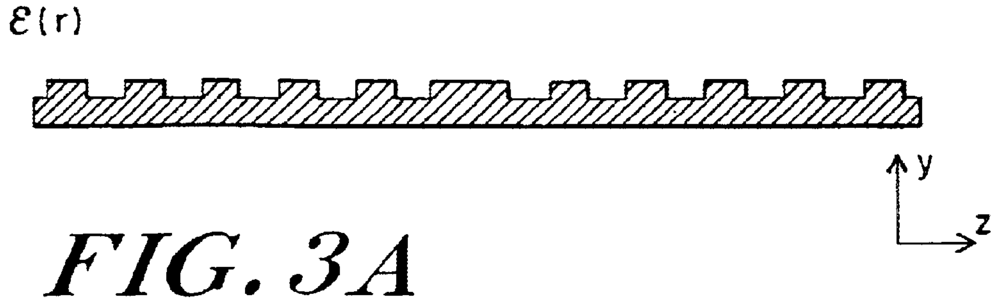
FIG. 3A is a schematic of dielectric constant $\epsilon(r)$ of a two-dimensional waveguide with a grating.
Figure 3B:
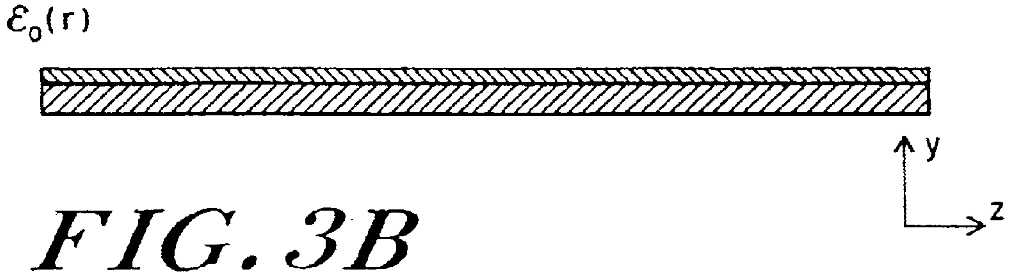
FIG. 3B is a schematic of zeroth order Fourier component $\epsilon_0(r)$ of $\epsilon(r)$.
Figure 3C:
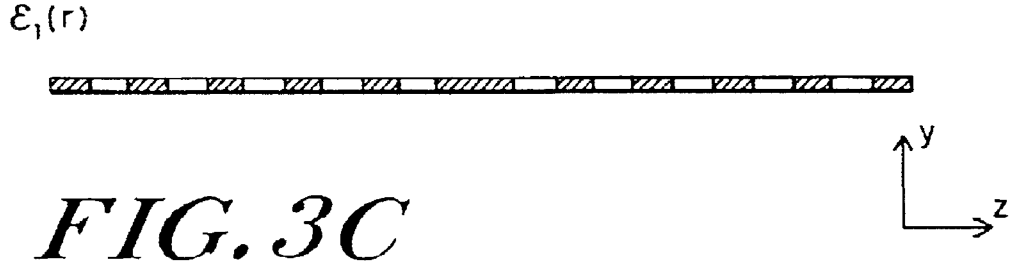
FIG. 3C is a schematic of grating perturbation $\epsilon_1(r)$.
Figure 4:
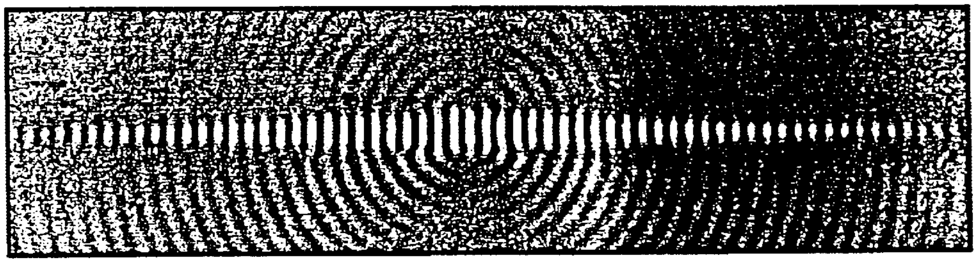
FIG. 4 is the electric field amplitude of the p-like resonant mode in a waveguide with a quarter-wave shifted grating.

If the quarter-wave shift is positive, that is, high index material is added to create the defect, as in FIG. 3A, the resonant mode is a p-like state, illustrated in FIG. 4. FIG. 4 is the electric field amplitude of the p-like resonant mode in a waveguide with a quarter-wave shifted grating. Note that the gray scale has been saturated in order to emphasize the far-field radiation pattern. For this state, $$R(\varepsilon_1) = \int_0^{2\pi} d\theta |P(\theta)|^2 |F(\beta(1+\delta\cos\theta)) - F(\beta(1-\delta\cos\theta))|^2 \qquad (7)$$

where δ=0.847 is the ratio of the cladding refractive index to the effective index of the guided mode. To reduce radiation losses and so increase the resonator Q, the second factor in the integrand is made small. One way to achieve this is to make the Fourier transform F(k) symmetric about k=β for some values of k in the interval [β(1−δ),β(1+δ)].

Figure 5:
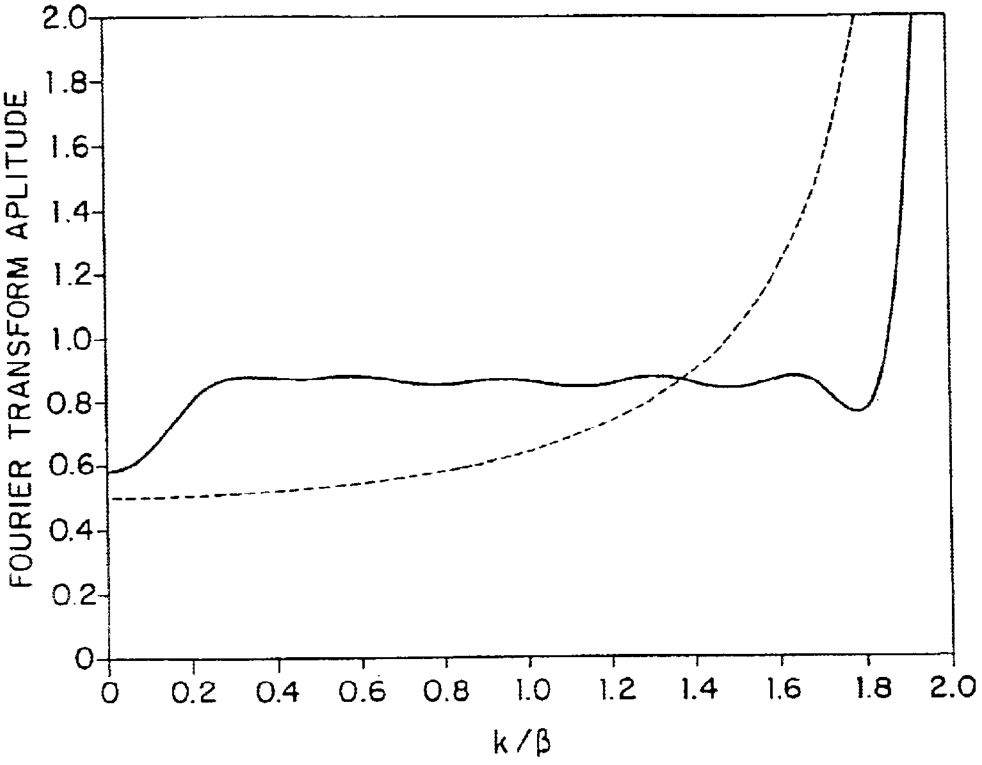
FIG. 5 is a graph showing the Fourier transform F(k) for the original grating structure (dashed line) and a new grating structure (solid line)

FIG. 5 is a graph showing the Fourier transform F(k) for the original grating structure (dashed line) and a new grating structure (solid line). The solid line representing F(k) for the new grating structure is indeed fairly symmetric about k=β as desired. To obtain the new structure, the positions of ten etched grooves are shifted as compared to their original positions. The five grooves to the right of the quarter-wave shift are shifted to the right by 0.0775 μm, 0.0554 μm, 0.0348 μm, 0.0188 μm, and 0.0083 μm, respectively. In this specific embodiment, the change in the positions of the grooves is administered symmetrically on both sides of the quarter-wave shift so that a total of ten grooves are moved. To keep the average index of the defect constant and consequently to assure that the resonant wavelength is not altered significantly, the width of the etched grooves is retained at 0.25 μm. Thus, the shifting of the grooves results in a local phase shift of the grating.

Figure 6A:
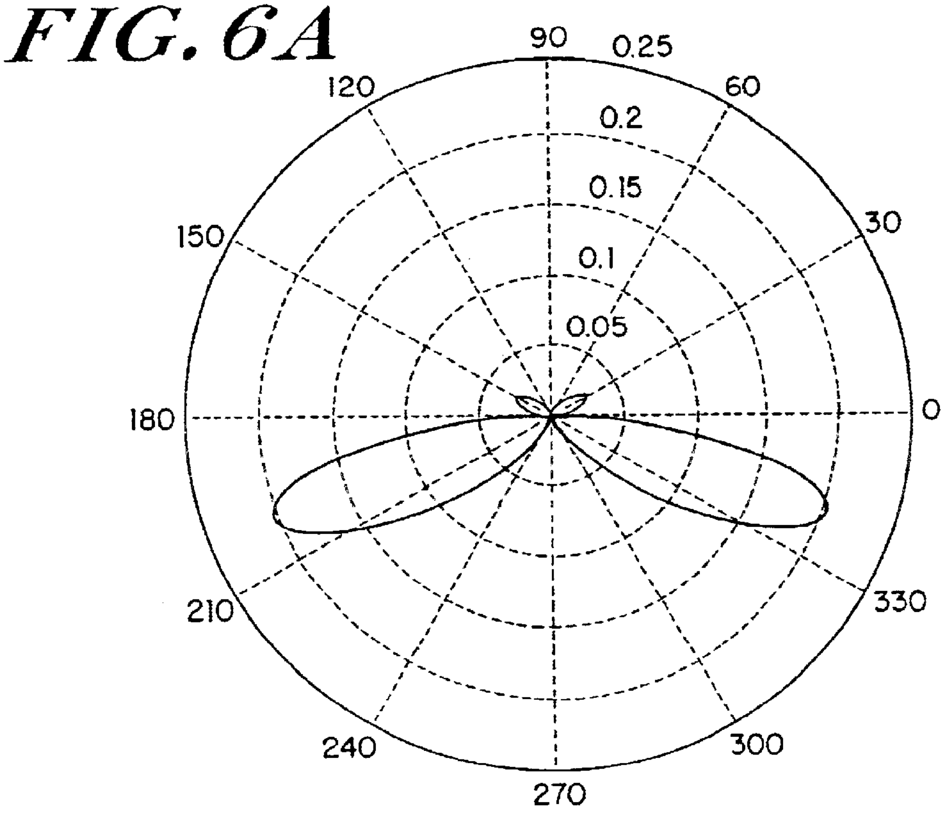
FIGS. 6A and 6B show the far-field radiation patterns from the original and the new grating structures.
Figure 6B:
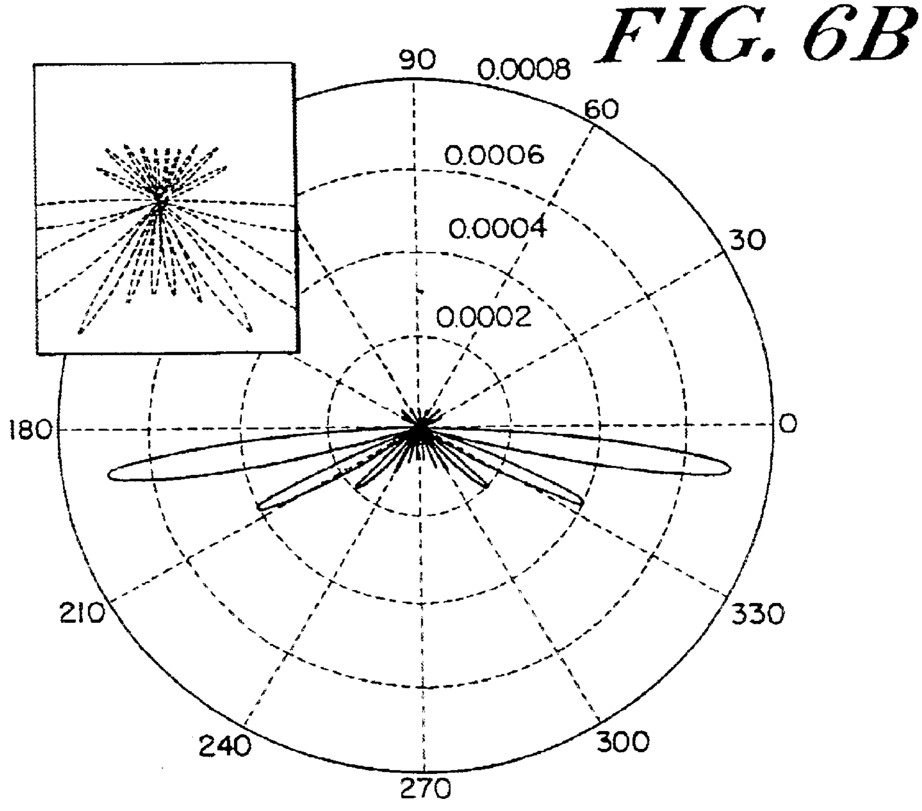

FIGS. 6A and 6B show the far-field radiation patterns from the original and the new grating structures. FIG. 6A shows radiation intensity as a function of far-field angle for the original grating with the quarter-wave shift. The mode has quality factor Q=11280. FIG. 6B shows radiation intensity for the new grating structure with the positions of ten grooves readjusted.

The radiation field of the new resonant structure is indeed composed of high angular momentum cylindrical waves, and so the radiation pattern has several nodal planes. The new structure has a mode quality factor $Q=5\times10^6$, which is an improvement of about a factor of 500 over the original value. One also could move fewer or a larger number of grooves to achieve a similar effect. In general, the more grooves that are repositioned, the higher Q-value one can obtain. In principle, there is no limit how much the radiation Q can be improved. It is also noted that the improvement in Q is achieved here without having to change substantially the characteristics, i.e., the symmetry and the modal volume, of the near-field pattern.

While in this example the modification to the grating was administered by repositioning the etched grooves in the z-direction, this is not a requirement. Instead, one may alter the positions of the grating teeth while keeping the width of the teeth constant, or one can change the width and the position both of the grating teeth and of the grooves simultaneously. Grooves can also be moved in an asymmetric fashion on either side of the quarter-wave shift. In fact, there is no restriction on modifying the form of the grating profile. While in the examples the grating is altered so that the dielectric constant remains piecewise constant, the modification may be such that this no longer holds.

Those skilled in the art will appreciate that the arguments presented above apply not only to square-tooth gratings with a quarter-wave shift, but carry over to all types of gratings with phase shifts of any size. The grating can be created on any number of surfaces of the waveguide, and/or inside the waveguide. In addition, the defect does not have to be restricted to a simple phase shift, but it may be created by changing the geometry or the refractive index of the resonator in any fashion. The analysis pertains also to any other structure with a degree of periodicity in the z-direction that may constitute the resonator. The structure can be a multilayer film, or any one-dimensional photonic crystal structure. The method is general, and also applies to TM polarized modes in a two-dimensional waveguide, or, to any three-dimensional waveguide grating defect.

Figure 7A:
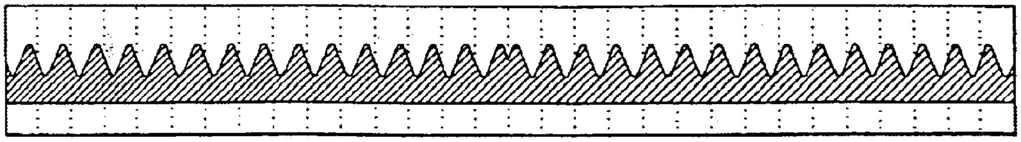
FIG. 7A is a cross-sectional view of the central section of a grating defect resonator with a sinusoidal grating near the quarter-wave shift.

Another example of the invention is reducing radiation loss for a defect mode in a SiON waveguide with a sinusoidal grating, embedded in a $SiO_2$ cladding. The core has a refractive index of 1.58. The grating is created on the surface of a two-dimensional waveguide and a quarter-wave shift defect is inserted, as indicated in FIG. 7A. FIG. 7A is a cross-sectional view of the central section of a grating defect resonator with a sinusoidal grating near the quarter-wave shift. The boundary between the core and the surrounding cladding material has a functional form $$\frac{d}{2}\cos\left(\frac{2\pi z}{\Lambda} - \phi(z)\right) \qquad (9)$$

where d is the depth of the corrugation, Λ is the grating pitch, and ϕ(z) is the grating local phase shift.

Sections of length Λ are indicated in FIG. 7A with dotted lines. The function ϕ(z) is plotted in FIG. 7B (dashed line). The total phase shift, defined as the difference between the local phase shifts on the two sides of the center far from the resonator, is π, corresponding to a quarter-wave shift. This quarter-wave shift appears as an abrupt discontinuity in ϕ(z) at z=0.

Figure 7B:
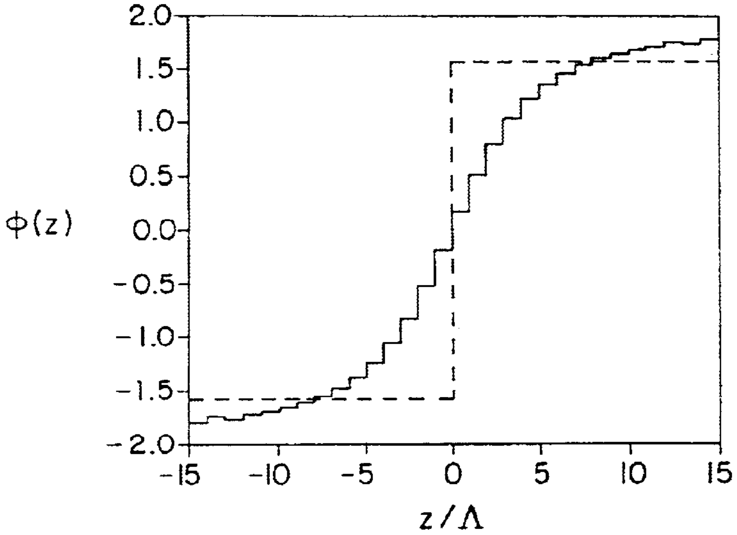
FIG. 7B is a plot of the local phase shift $\phi(z)$ as a function of z for the original and the distributed quarter-wave shifts.

The defect is modified to increase its radiation Q by changing the functional form of the local phase shift. An optimal design for ϕ(z) is shown in FIG. 7B (solid line). While in this example a local phase shift function that is piecewise constant has been chosen, this is not necessary. The local phase shift can be smooth, and/or have any number of discontinuities. In general, one can change any combination of the local pitch or local phase shift to increase the radiation Q. Since a π phase shift is equivalent to a (2N+1)π phase shift, where N is an integer, the local phase shift can also differ on the two sides of the phase shift by an amount larger than π, or smaller than 0.

Figure 7C:
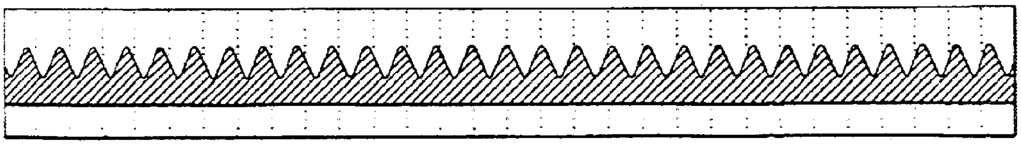
FIG. 7C is a cross-sectional view of the improved grating defect resonator.

The change in the grating profile may cause a small (second-order) shift in the resonant wavelength of the defect mode. In this example, we compensated for this by increasing the total grating phase shift from π. One can also compensate for the wavelength shift by appropriately changing the resonator in other ways, for instance, by changing the waveguide thickness or by decreasing the size of the total phase shift. Thus, the resonator can be designed to have low loss while maintaining its resonance frequency. FIG. 7C is a cross-sectional view of the improved grating defect resonator.

Figure 8A:
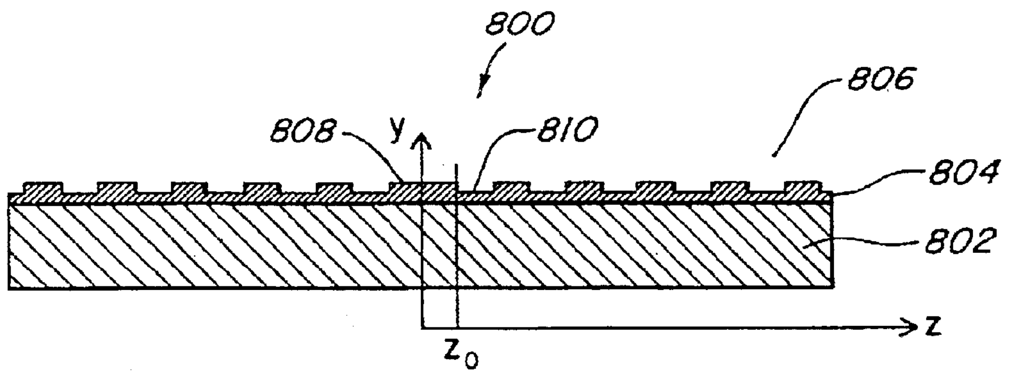
FIG. 8A is a side view of a block diagram of a quarter-wave shift defect in a SiON core waveguide with a $Si_3N_4$ cap.
Figure 8B:
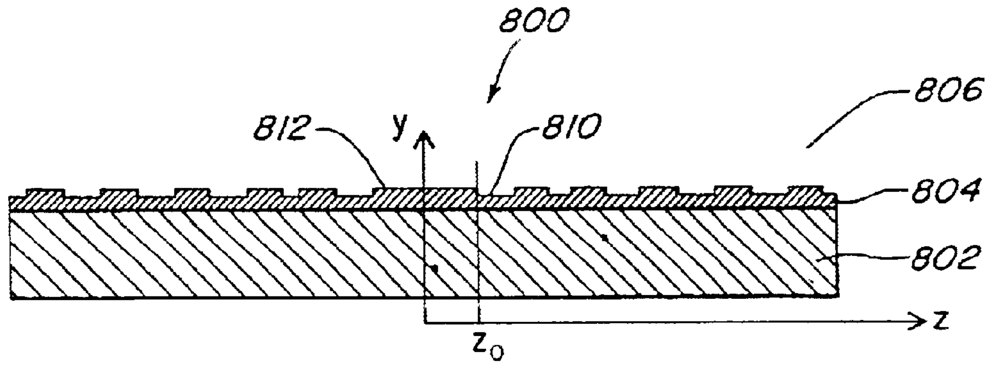
FIG. 8B is a side view of a block diagram of a modified quarter-wave shift defect in a SiON core waveguide with a $Si_3N_4$ cap.

FIGS. 8A and 8B show another example of a waveguide grating 800. In this case, the waveguide core 802 has thickness 0.5 μm, made of SiON of index 1.6641, and the waveguide has a cap 804 of thickness 0.1 μm, made of $Si_3N_4$. A grating of pitch 0.5 μm and depth 0.05 μm is etched into the cap material. The surrounding cladding 806 is $SiO_2$. FIG. 8A is a side view of a quarter-wave shift defect 808 in the waveguide grating. The first groove 810 to the right of the phase shift center begins at $z_0$=0.25 μm.

The decay of the electromagnetic field energy in the cavity is simulated by solving Maxwell's equations in the time-domain on a finite-difference grid. The exponential decay of the energy in the cavity yields the radiation Q of the defect mode. Using a rectangular grid of 0.05 μm×0.05 μm for the finite element calculation, a radiation Q=20,130 is obtained.

Figure 9:
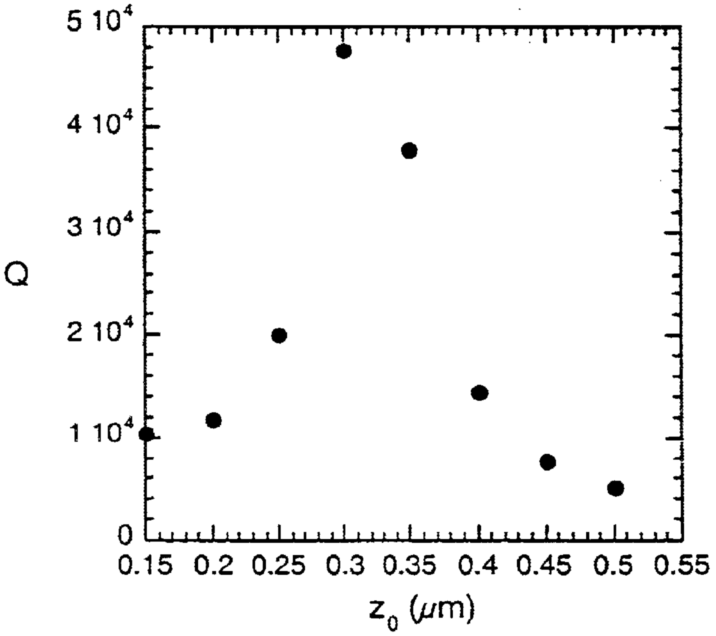
FIG. 9 is a graph with a plot of radiation Q versus groove position $z_0$ for the defect in FIGS. 8A and 8B.

The grating 800 is modified with a defect 812 by shifting the two grooves closest to the center tooth in a symmetrical fashion. By changing $z_0$, as indicated in FIG. 8B, one can modify the radiation Q of the defect mode. FIG. 9 is a graph showing a plot of the radiation Q as a function of the groove position $z_0$ for the defect in FIGS. 8A and 8B. The results indicate that one can either increase or decrease the Q by an appropriate selection of the groove position. For $z_0$=0.3 μm, one achieves an increase of about a factor of 2 in the radiation Q.

Figure 10A:
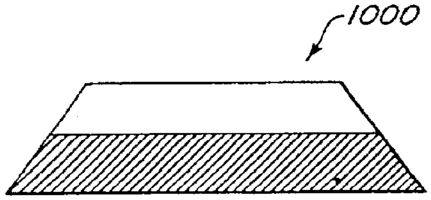
FIG. 10A is a cross-sectional view of a block diagram of a GaAs core waveguide in an AlGaAs cladding.

FIG. 10A is a cross-sectional view of a GaAs core waveguide 1000 in an AlGaAs cladding. The cross-section is trapezoidal, with a base width of 1.4 μm, sidewall angle of 54°, and thickness of 0.38 μm. A grating is etched from the top of the waveguide, to a depth of 0.17 μm, as indicated in gray, and the grooves are refilled with AlGaAs.

Figure 10B:
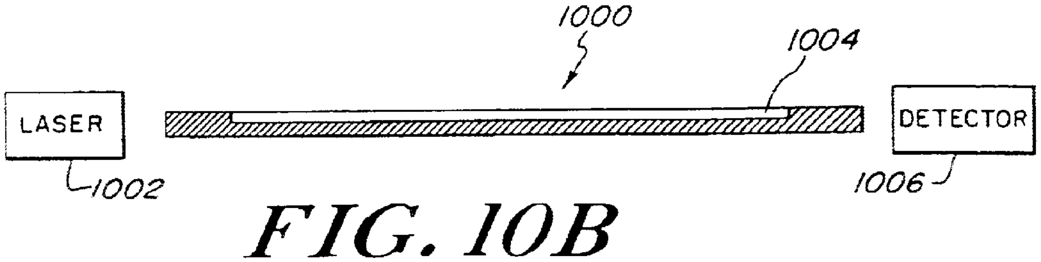
FIG. 10B is a schematic illustration of the method used to measure the transmission spectrum of a grating with a defect.

The radiation Q of a defect in this grating can be measured as schematically shown in FIG. 10B. Light is coupled into the GaAs waveguide 1000 from a tunable laser source 1002. The grating 1004 with a quarter-wave shift is indicated on the figure as a gray area. At the opposite end of the waveguide, light is collected into a detector 1006. In this way, the spectral response of the defect is measured. The normalized transmission intensity at the defect resonant frequency is $$T = \left(1 + \frac{Q_0}{Q}\right)^{-2} \tag{10}$$

where $Q_0$ is the quality factor of the defect mode without losses. Thus, the higher the radiation Q is, the higher the transmission at the resonant wavelength will be.

Figure 11:
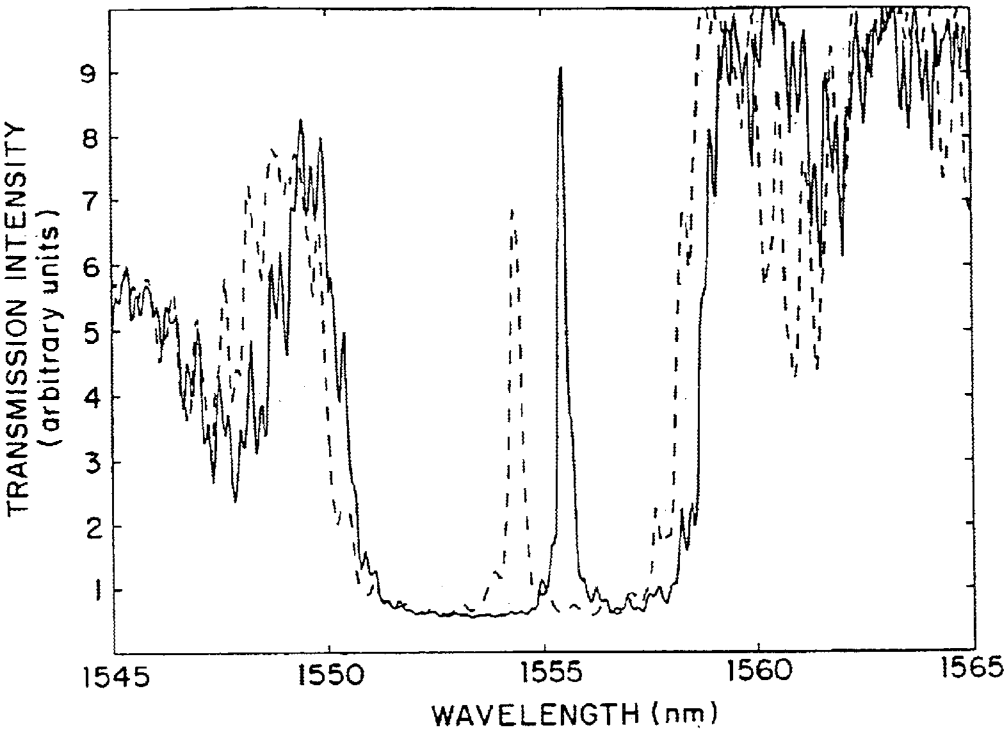
FIG. 11 is a graph of the transmission spectra of a quarter-wave shift defect (dashed line) and the modified defect (solid line)

FIG. 11 is a graph showing the transmission spectra for a quarter-wave shift defect (dashed line) and for a defect, which has been modified to increase its radiation Q (solid line). The total length of the grating for both devices was 161.4 μm. The spectra show a stopband between approximately 1551 nm and 1558 nm. There is a slant in the overall transmission intensity as a function of wavelength, due to laser alignment issues.

Taking this into account, the normalized transmission peak for the quarter-wave shifted defect at 1554.3 nm is 0.76. From $Q_0$=6000, the radiation Q of the quarter-wave shift defect is estimated to be about 40,000. The transmission of the modified defect at 1555.5 is unity within measurement accuracy. This means that the radiation Q of the modified defect is so high that it cannot be measured exactly in this setup. Nevertheless, one can deduce a lower limit on the Q of 400,000. There is an improvement in the radiation Q of at least one order of magnitude.

Waveguide Microcavity

Figure 12A:
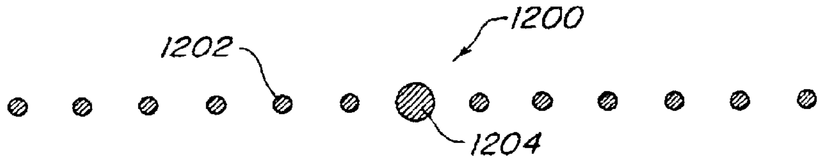
FIG. 12A is a cross-sectional view of a waveguide microcavity structure with an array of dielectric cylinders and a point defect.
Figure 12B:
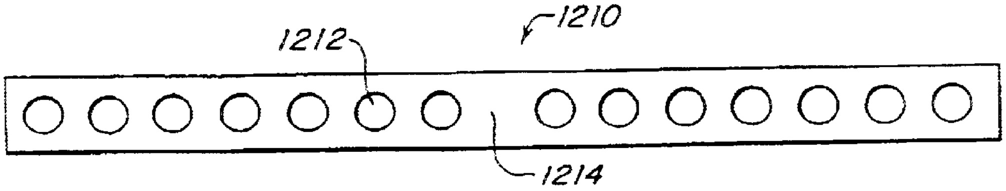
FIG. 12B is a cross-sectional view of a channel waveguide with an array of holes and a phase shift introduced into the periodic array in order to create a cavity.

As another embodiment of the invention, a method of improving the radiation Q in a waveguide microcavity structure is shown. A microcavity confines the electromagnetic energy to a volume with dimensions comparable to the wavelength of the electromagnetic wave. Examples of waveguide microcavity structures are shown in FIGS. 12A and 12B. The cavity is introduced by creating a strong periodic index contrast along a waveguide, and by introducing a defect into the periodic structure. FIG. 12A is a cross-sectional view of a waveguide microcavity structure 1200 with an array of dielectric cylinders 1202. The center cylinder 1204 is different from all the other cylinders in order to create a point defect. FIG. 12B is a cross-sectional view of a channel waveguide 1210 with an array of holes 1212. A phase shift 1214 is introduced into the periodic array in order to create a cavity. The holes are filled with a low index dielectric material.

In a waveguide microcavity structure, light is confined within the waveguide by index guiding. However, there are radiation losses away from the waveguide. As an example, consider first the radiation losses associated with a single-rod defect in an otherwise one-dimensionally periodic row of dielectric rods in air in 2D. Let the distance between the centers of neighboring rods be a, and let the radius of the rods be r=0.2a. Without the presence of the defect, there are guided-mode bands lying below the light-cone and a mode gap ranging from 0.264 (2 πc/a) to 0.448 (2 πc/a) at the Brillouin zone edge. Although these guided modes are degenerate with radiation modes above the light line, they are bona-fide eigenstates of the system and consequently are orthogonal to, and do not couple with, the radiation modes.

The presence of a point defect, however, has two important consequences. Firstly, it can mix the various guided modes to create a defect state that can be exponentially localized along the bar-axis. Secondly, it can scatter the guided modes into the radiation modes and consequently lead to resonant (or leaky) mode behavior away from the bar-axis. It is this scattering that leads to an intrinsically finite value for the radiation Q.

Figure 13:
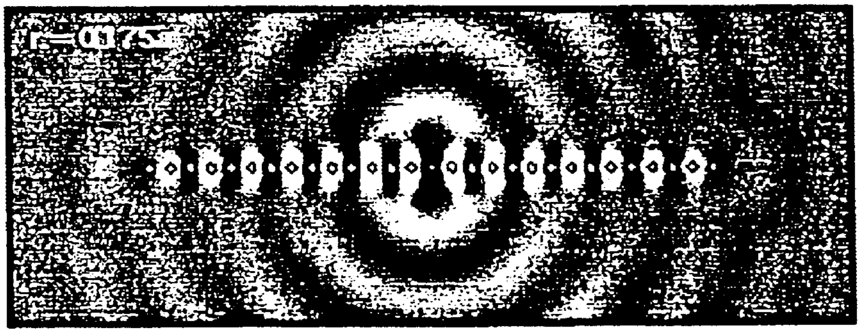
FIG. 13 is the electric field associated with a defect-state at $\omega$=0.267 (2 $\pi$c/a) created using a defect rod of radius 0.175a, with radiation Q=570.

Two approaches that configure the structure for a high radiation Q are provided. One approach, as accomplished in prior art, is simply to delocalize the defect state resonance. This can be accomplished by either delocalizing along the direction of periodicity, perpendicular to this direction, or along all directions. Delocalizing the defect state involves reducing the effect of the defect perturbation and consequently the scattering of the guided mode states into radiation modes. In the simple example involving a bar, this effect by delocalizing along the bar (or the direction of periodicity) is now illustrated. If the defect rod is made smaller in radius than the photonic crystal rods (r=0.2a) one can obtain a monopole (or s-like) defect state as shown in FIG. 13. FIG. 13 is the electric field associated with a defect-state at ω=0.267 (2 πc/a) created using a defect rod of radius 0.175a, with radiation Q=570. As the properties of the defect rod are perturbed further, the defect state moves further away from the lower band edge into the gap. As it does this, it becomes more localized, accumulating more and more k-components, leading to stronger coupling with the radiation modes. The gray scale has been saturated in order to emphasize the far-field radiation pattern.

Figure 14:
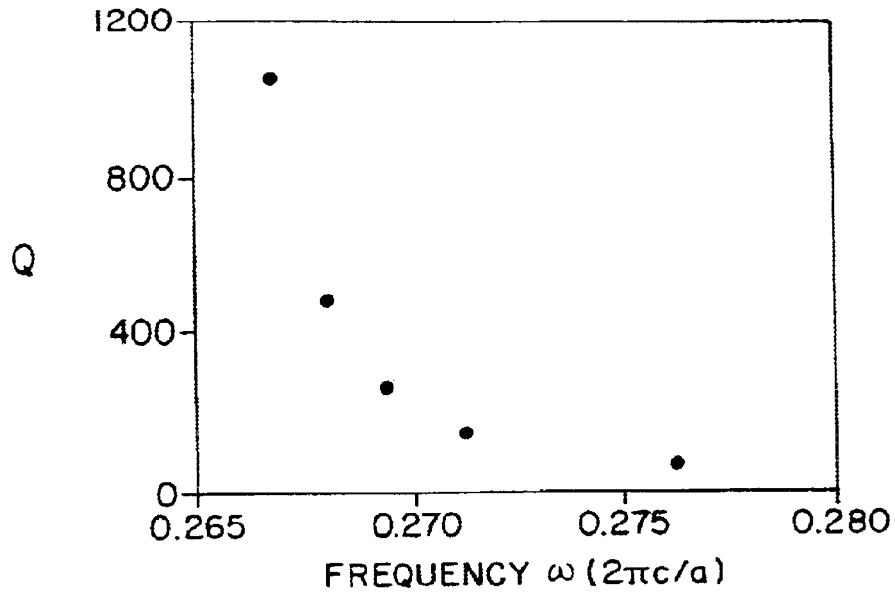
FIG. 14 is a graph of the radiation Q as a function of the position in frequency of the defect state.

A calculation of the radiation Q for the defect state as a function of frequency is shown in FIG. 14. FIG. 14 is a graph of the radiation Q as a function of the position in frequency of the defect state. The radiation Q is clearly highest when the frequency of the defect state is near the lower band edge at $\omega_1$=0.264(2 πc/a) where it is most delocalized. As the defect state moves away from the band edge, its localization increases typically as $(\omega-\omega_1)^{1/2}$ leading to a Q that falls off as $(\omega-\omega_1)^{3/2}$.

Another approach is to exploit the symmetry properties of the defect-state in order to introduce nodes in the far-field pattern that could lead to weak coupling with radiation modes. This mechanism depends sensitively on the structural parameters of the defect and typically leads to maximum Q for defect frequencies within the mode gap. To illustrate the idea, consider the nature of the defect states that can emerge from the lower and upper band-edge states in the simple working example. As has been seen, making the defect-rod smaller draws a monopole (s-like) state from the lower band-edge into the gap. Using a Green-function formalism it can be shown that the far-field pattern for these two types of defect-state is proportional to a term:

$$f(\theta)=\int_{-\infty}^{\infty} dz\varepsilon_{eff}(z)e^{-K|z|}e^{-i\frac{\omega}{c}z\cos\theta}(e^{ikz}\pm e^{-ikz}) \tag{11}$$

where z is along the axis of periodicity, $\epsilon_{eff}(Z)$ is an effective dielectric function for the system, κ is the inverse localization length of the defect-state, θ is an angle defined with respect to the z-axis, and k is the propagation constant ~π/a. The plus and minus signs refer to the monopole and dipole states, respectively.

Now it is clear from equation (11) that the presence of the minus sign for the dipole-state could be exploited to try to cancel the contributions of opposite sign. Indeed, one might expect that by tuning the structural parameters of the defect, i.e., changing $\epsilon_{eff}(Z)$ one could achieve f(θ)=0 (add nodal planes) for several values of θ. The presence of such extra nodal planes could greatly reduce the coupling to radiation modes leading to high values of Q. Of course, one would expect this cancellation to work well only over a narrow range of parameter space.

Figure 15:
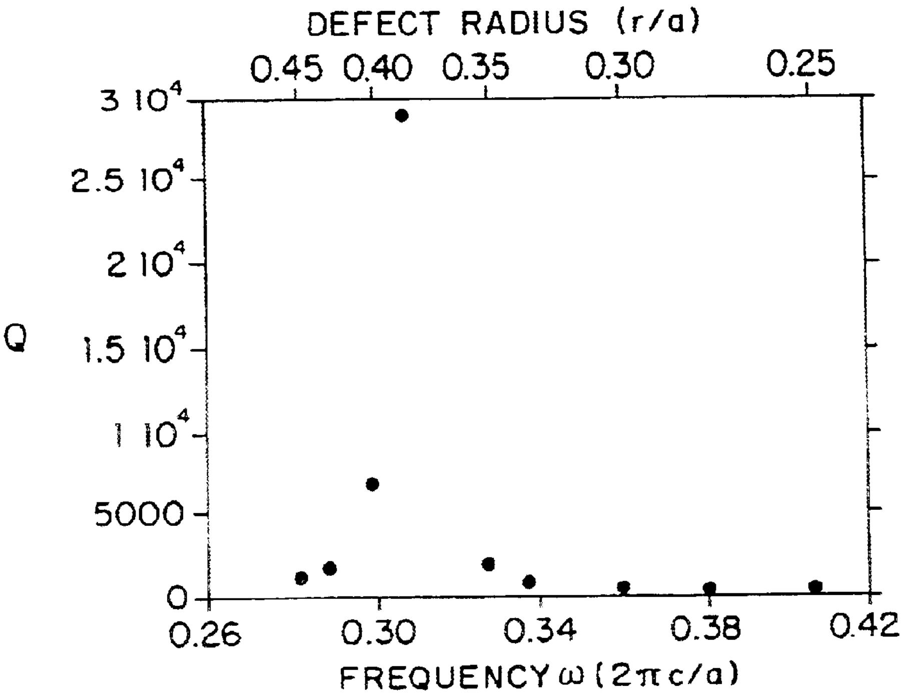
FIG. 15 is a plot of radiation Q as a function of frequency and radius of the defect state.
Figure 16A:
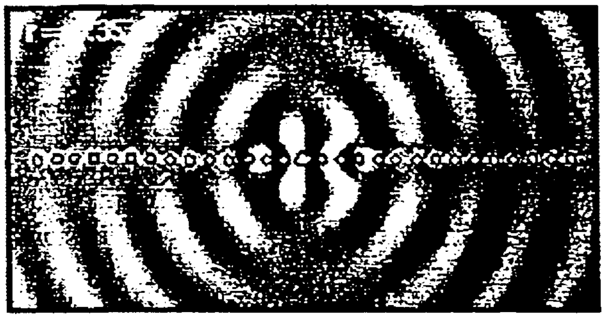
FIGS. 16A–16C are the electric field patterns for the defect-states corresponding to defect radii r=0.35a, r=0.375a, and r=0.40a, respectively.
Figure 16B:
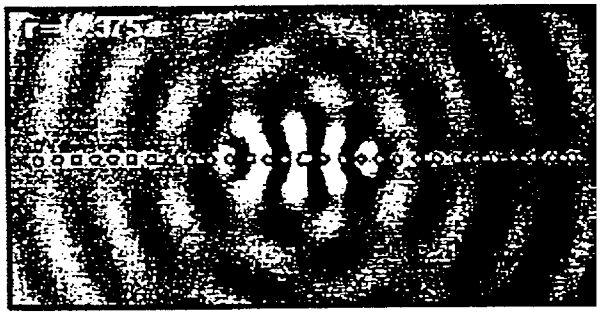
Figure 16C:
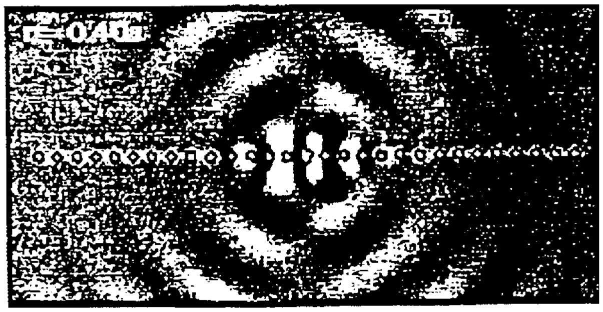

In FIG. 15, the calculated values of radiation Q as a function of frequency and radius of the defect state for the dipole-state are plotted, obtained by increasing the radius of the defect rod in the example. It will be appreciated that the highest Q (~30,000) is now obtained for a defect frequency deep within the mode gap region. Note also that the Q of the defect-state is a very sensitive function of the structural parameters of the defect, reaching its maximum for a defect radius of 0.375a. The electric field patterns for the defect-states corresponding to defect radii r=0.35a, r=0.375a, and r=0.40a are shown in FIGS. 16A–16C, respectively. The field pattern for r=0.375a is clearly distinct from the others, revealing extra nodal planes along the diagonals. The ability to introduce extra nodal planes is at the heart of this new mechanism for achieving very large values of Q. For the monopole state of FIG. 14, this is not possible.

While in the description heretofore, the focus has been primarily on the structure as shown in FIG. 12A. it will be appreciated by people skilled in the art that similar principle can be applied in other waveguide microcavity structure as well. For example, to improve the radiation Q in the waveguide microcavity structure as shown in FIG. 12B, one could adjust the radius of the holes in the vicinity of the defect, or the dielectric constant of the defect region, to create extra nodal planes in the far-field radiation pattern, and improve the radiation Q.

Microcavity in a Photonic Crystal Slab

FIG. 17A is a perspective view of a simplified diagram of a photonic crystal slab 1700 with a point defect microcavity 1702. The photonic crystal consist of a slab waveguide that is periodically patterned in two-dimensions. In the specific case illustrated, the photonic crystal is a triangular array of holes in a single layer slab, but the patterning may take any form, and the dielectric slab also may contain any number of layers. The thickness of the layers may vary along the slab. Light is confined in the cavity by a photonic band gap effect in the plane of periodicity, and by index guiding in the direction perpendicular to this plane. As previously described, the resonant mode can couple to radiation modes and therefore the mode quality factor is finite.

FIG. 17B is a perspective view of a simplified diagram schematically an improved microcavity 1706 in a photonic crystal slab 1704 where the geometry of the patterning or the dielectric constant of the defect region is altered in a symmetrical fashion to create a near-field pattern that modifies the far-field pattern in an analogous way to the case of the waveguide microcavity. In this way, radiation losses are reduced and the Q factor increases.

FIG. 17C is a perspective view of a simplified diagram of another improved microcavity 1710 in a photonic crystal slab 1708 where the geometry of the patterning or the dielectric constant of the defect region is altered in an asymmetrical fashion to achieve the same goal of increasing the radiation Q.

It will be appreciated by people skilled in the art that the method of the invention is applicable in the case of the photonic crystal slab defect resonator where the electromagnetic energy is confined to a volume with dimensions much larger than the wavelength of the electromagnetic wave.

Disk Resonator

Figure 18A:
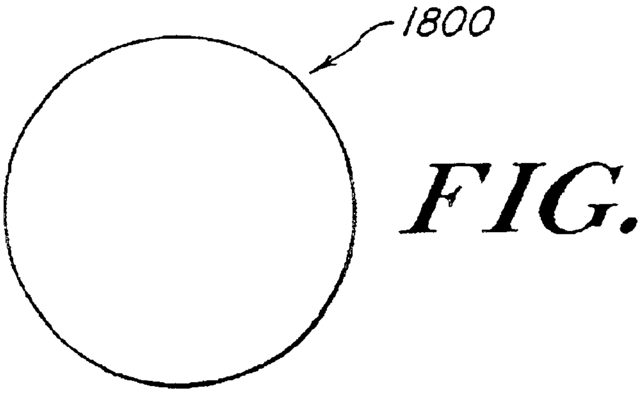
FIG. 18A is perspective view of a simplified diagram of a disk resonator.
Figure 18B:
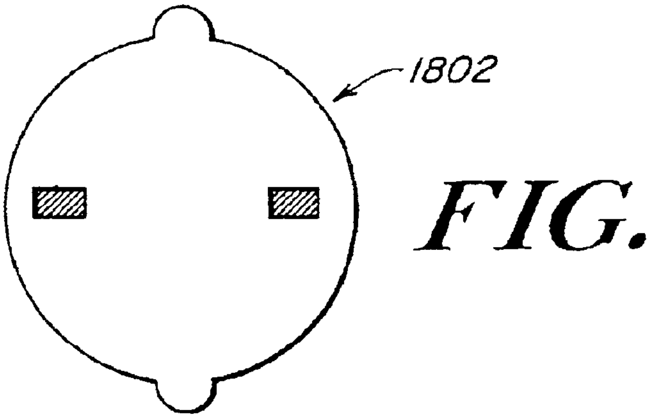
FIG. 18B is a perspective view of a simplified diagram of an improved disk resonator where the geometry or the dielectric constant of the resonator is altered in a symmetrical fashion to increase the radiation Q.
Figure 18C:
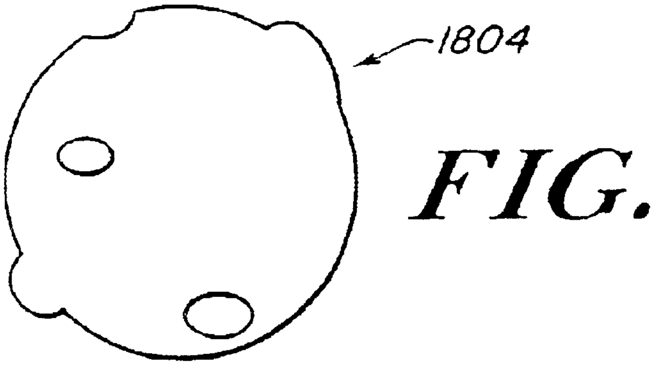
FIG. 18C is a perspective view of a simplified diagram of an improved disk resonator where the geometry or the dielectric constant of the resonator is altered in an asymmetric fashion to increase the radiation Q.

FIG. 18 is a simplified schematic diagram of a disk resonator 1800. FIG. 18B is a simplified schematic diagram of an improved disk resonator 1802 where the geometry or the dielectric constant of the disk is altered in a symmetrical fashion to create a near-field pattern that modifies the far-field pattern in an analogous way to the case of the waveguide microcavity, in order to increase the Q-factor. FIG. 18C is a simplified schematic diagram of another improved disk resonator 1804 where the geometry or the dielectric constant of the disk is altered in an asymmetrical fashion to achieve the same goal. It is noted that the same method also applies to resonators of any shape, such as, for instance, a square dielectric resonator.

A description of how the method can be applied when the modification of the resonator structure involves adding a perturbation δε(r) to the dielectric constant defining the resonator and its surroundings will now be provided. The field due to the modified resonator from equation (1) is obtained as $$E(r)=E_0(r)-\frac{\omega^2}{c^2}\int dr'\overline{G}(r,r')\delta\varepsilon(r')E(r') \tag{12}$$

where $E_0(r)$ is the electric field of the original resonator mode, $\overline{G}(r, r')$ is the Green's function associated with the resonator dielectric structure, ω is the frequency of the resonant mode, and E(r) is the resulting electric field due to the modified resonator.

According to equation (12), the resulting electric field in the far field is a superposition of the original radiation field and the one induced by the perturbation. One can design this perturbation so that the induced field interferes destructively with the original radiated field, by minimizing the functional R:

$$R(\delta\varepsilon) = \int d\Omega \left| E_0(r) - \frac{\omega^2}{c^2} \int dr' \overline{G}(r, r')\delta\varepsilon(r')E(r') \right|^2 \quad (13)$$

where the integral is over solid angles. As long as the perturbation is small, one can replace E(r') by $E_0$(r') in equation (10) and the minimization procedure is straightforward to carry out. Moreover, it will be appreciated by those skilled in the art that it is also possible to design this perturbation in a self-consistent way even if the perturbation is not assumed to be small. In this case, one must keep equation (12) in mind while minimizing the functional equation (10).

If the far-field medium is homogenous, then the resonant mode from the original disk resonator radiates into a definite angular momentum channel. By introducing a perturbation, the coupling into this far-field channel can be reduced, and thus decrease total radiation losses. This in turn leads to an improvement in the quality factor of the resonator.

Ring Resonator

Figure 19A:
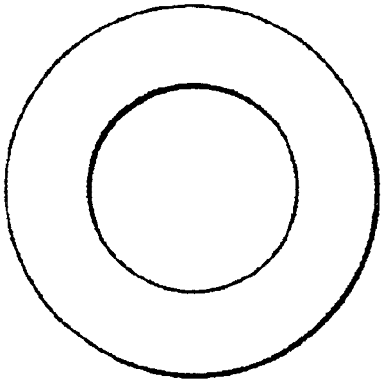
FIG. 19A is a perspective view of a simplified diagram of a ring resonator.
Figure 19B:
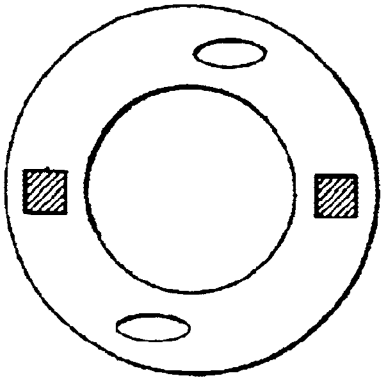
FIG. 19B is a perspective view of a simplified diagram of an improved ring resonator where the geometry or the dielectric constant of the resonator is altered in a symmetrical fashion to increase the radiation Q.
Figure 19C:
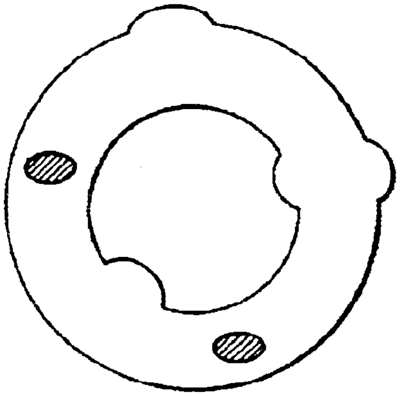
FIG. 19C is a perspective view of a simplified diagram of an improved ring resonator where the geometry or the dielectric constant of the resonator is altered in an asymmetric fashion to increase the radiation Q.

FIG. 19 is a simplified schematic diagram of a ring resonator 1900. FIG. 19B is a simplified schematic diagram of an improved ring resonator 1902 where the geometry or the dielectric constant of the ring is altered in a symmetrical fashion to create a near-field pattern that modifies the far-field pattern in an analogous way to the case of the disk resonator, in order to increase the Q-factor. FIG. 19C is a simplified schematic diagram of another improved ring resonator 1904 where the geometry or the dielectric constant of the ring is altered in an asymmetrical fashion to achieve the same goal. If the far-field medium is homogenous, then the resonant mode from the original ring resonator radiates into a definite angular momentum channel. By introducing a perturbation, one can reduce coupling into this far-field channel and thus decrease total radiation losses. This in turn leads to an improvement in the quality factor of the resonator.

Although the present invention has been shown and described with respect to several preferred embodiments thereof, various changes, omissions and additions to the form and detail thereof, may be made therein, without departing from the spirit and scope of the invention.

What is claimed is:

1. A method of making a low-loss electromagnetic wave resonator structure comprising:

providing a resonator structure, said resonator structure including a confining device and a surrounding medium, said resonator structure supporting at least one resonant mode, said resonant mode displaying a near-field pattern in the vicinity of said confining device and a far-field radiation pattern away from said confining device, said surrounding medium supporting at least one radiation channel into which said resonant mode can couple; and specifically configuring said resonator structure to reduce or eliminate radiation loss from said resonant mode into at least one of said radiation channels, while keeping the characteristics of the near-field pattern substantially unchanged.

2. The method of claim 1, wherein said step of configuring comprises a modification of said far-field pattern.

3. The method of claim 1, wherein said step of configuring comprises a modification of the geometry or refractive index of said confining device.

4. The method of claim 3, wherein said modification has at least one plane of symmetry.

5. The method of claim 3, wherein said modification has no plane of symmetry.

6. The method of claim 1, wherein said step of configuring comprises an introduction of at least one nodal plane into said far-field pattern.

7. The method of claim 1, wherein said confining device operates using index confinement effects, photonic crystal band gap effects, or a combination of both.

8. The method of claim 1, wherein said surrounding medium is homogeneous.

9. The method of claim 1, wherein said surrounding medium is inhomogeneous.

10. The method of claim 1, wherein said radiation channels comprise superpositions of at least one spherical wave.

11. The method of claim 1, wherein said radiation channels comprise superpositions of at least one cylindrical wave.

12. The method of claim 1, wherein said confining device comprises a waveguide with a grating where said grating contains at least one defect.

13. The method of claim 12, wherein said step of configuring comprises modifying the dielectric constant of the grating.

14. The method of claim 12, wherein said step of configuring comprises modification of the local phase shift.

15. The method of claim 1, wherein said confining device comprises a waveguide microcavity.

16. The method of claim 1, wherein said confining device comprises a photonic crystal slab.

17. The method of claim 1, wherein said confining device comprises a disk resonator.

18. The method of claim 1, wherein said confining device comprises a ring resonator.

19. A method of making a low-loss electromagnetic wave resonator structure comprising:

providing a resonator structure, said resonator structure including a confining device and a surrounding medium, said resonator structure supporting at least one resonant mode, said resonant mode displaying a near-field pattern in the vicinity of said confining device and a far-field radiation pattern away from said confining device, said surrounding medium supporting at least one radiation channel into which said resonant mode can couple; and specifically configuring said resonator structure to increase radiation loss from said resonant mode into at least one of said radiation channels, while keeping the characteristics of the near-field pattern substantially unchanged.

20. The method of claim 19, wherein said radiation channel comprises of one or more spatial directions.

21. A method of making a low-loss acoustic wave resonator structure comprising:

providing a resonator structure, said resonator structure including a confining device and a surrounding medium, said resonator structure supporting at least one resonant mode, said resonant mode displaying a near-field pattern in the vicinity of said confining device and a far-field radiation pattern away from said confining device, said surrounding medium supporting at least one radiation channel into which said resonant mode can couple; and specifically configuring said resonator structure to reduce or eliminate radiation loss from said resonant mode into at least one of said radiation channels, while keeping the characteristics of the near-field pattern substantially unchanged.

22. A method of designing a low-loss electronic wave resonator structure comprising:

providing a resonator structure, said resonator structure including a confining device and a surrounding medium, said resonator structure supporting at least one resonant mode, said resonant mode displaying a near-field pattern in the vicinity of said confining device and a far-field radiation pattern away from said confining device, said surrounding medium supporting at least one radiation channel into which said resonant mode can couple; and specifically configuring said resonator structure to reduce or eliminate radiation loss from said resonant mode into at least one of said radiation channels, while keeping the characteristics of the near-field pattern substantially unchanged.

23. A method of making a low-loss acoustic wave resonator structure comprising:

providing a resonator structure, said resonator structure including a confining device and a surrounding medium, said resonator structure supporting at least one resonant mode, said resonant mode displaying a near-field pattern in the vicinity of said confining device and a far-field radiation pattern away from said confining device, said surrounding medium supporting at least one radiation channel into which said resonant mode can couple; and specifically configuring said resonator structure to increase radiation loss from said resonant mode into at least one of said radiation channels, while keeping the characteristics of the near-field pattern substantially unchanged.

24. The method of claim 23, wherein said radiation channel comprises of one or more spatial directions.

25. A method of making a low-loss electronic wave resonator structure comprising:

providing a resonator structure, said resonator structure including a confining device and a surrounding medium, said resonator structure supporting at least one resonant mode, said resonant mode displaying a near-field pattern in the vicinity of said confining device and a far-field radiation pattern away from said confining device, said surrounding medium supporting at least one radiation channel into which said resonant mode can couple; and specifically configuring said resonator structure to increase radiation loss from said resonant mode into at least one of said radiation channels, while keeping the characteristics of the near-field pattern substantially unchanged.

26. The method of claim 25, wherein said radiation channel comprises of one or more spatial directions.

* * * * *